(12) United States Patent
Hall et al.

(10) Patent No.: US 8,519,865 B2
(45) Date of Patent: Aug. 27, 2013

(54) DOWNHOLE COILS

(75) Inventors: David R. Hall, Provo, UT (US); Craig Boswell, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 1429 days.

(21) Appl. No.: 11/860,795

(22) Filed: Sep. 25, 2007

(65) Prior Publication Data

US 2008/0083529 A1 Apr. 10, 2008

Related U.S. Application Data

(63) Continuation of application No. 11/860,761, filed on Sep. 25, 2007, which is a continuation-in-part of application No. 11/739,344, filed on Apr. 24, 2007, now Pat. No. 7,504,963, which is a continuation-in-part of application No. 11/421,387, filed on May 31, 2006, now Pat. No. 7,535,377, which is a continuation-in-part of application No. 11/421,357, filed on May 31, 2006, now Pat. No. 7,382,273, which is a continuation-in-part of application No. 11/133,905, filed on May 21, 2005, now Pat. No. 7,277,026.

(51) Int. Cl.
*G01V 3/00* (2006.01)

(52) U.S. Cl.
USPC .................. 340/854.8; 340/853.1; 340/854.1; 340/854.6

(58) Field of Classification Search
USPC ....................... 340/853.1, 854.3, 854.6, 854.8
See application file for complete search history.

(56) References Cited

U.S. PATENT DOCUMENTS

| | | | |
|---|---|---|---|
| 1,971,315 A | 8/1934 | Lear | |
| 2,000,716 A | 5/1935 | Polk | |
| 2,064,771 A | 12/1936 | Vogt | |
| 2,301,783 A | 11/1942 | Lee | |
| 2,331,101 A | 10/1943 | Beard | |
| 2,414,719 A | 1/1947 | Cloud | |
| 2,748,358 A | 9/1956 | Johnston | |
| 3,090,031 A * | 5/1963 | Lord | 340/854.8 |
| 3,170,137 A | 2/1965 | Brandt | |

(Continued)

OTHER PUBLICATIONS

Emmerich, Claude L., "Steady-State Internal Temperature Rise in Magnet Coil Windings," 21 *Journal of Applied Physics* 75-80 (Feb. 1950).

(Continued)

*Primary Examiner* — Hai Phan
*Assistant Examiner* — Amine Benlagsir
(74) *Attorney, Agent, or Firm* — Brinks Hofer Gilson & Lione

(57) ABSTRACT

In one aspect of the invention, a downhole tool string component comprises a tubular body with at least one end adapted for threaded connection to an adjacent tool string component. The end comprises at least one shoulder adapted to abut an adjacent shoulder of an adjacent end of the adjacent tool string component. An annular magnetic coupler is disposed within an annular recess formed in the at least one shoulder, and the magnetic coupler comprises a coil in electrical communication with an electrical conductor that is in electrical communication with an electronic device secured to the tubular body. The coil comprises a plurality of windings of wire strands that are electrically isolated from one another and which are disposed in an annular trough of magnetic material secured within the annular recess.

18 Claims, 11 Drawing Sheets

(56) References Cited

U.S. PATENT DOCUMENTS

| | | | | |
|---|---|---|---|---|
| 3,253,245 | A | 5/1966 | Brandt | |
| 3,742,444 | A | 6/1973 | Lindsey | |
| 3,823,296 | A | 7/1974 | Amagami et al. | |
| 3,876,972 | A | 4/1975 | Garrett et al. | |
| 3,967,201 | A | 6/1976 | Rorden | |
| 3,980,881 | A | 9/1976 | Veach et al. | |
| 4,012,092 | A | 3/1977 | Godbey | |
| 4,039,237 | A | 8/1977 | Cullen et al. | |
| 4,042,874 | A | 8/1977 | Quinn et al. | |
| 4,095,865 | A | 6/1978 | Denison et al. | |
| 4,176,894 | A | 12/1979 | Godbey | |
| 4,416,494 | A | 11/1983 | Watkins et al. | |
| 4,578,675 | A | 3/1986 | MacLeod | |
| 4,591,226 | A | 5/1986 | Hargett et al. | |
| 4,630,243 | A | 12/1986 | MacLeod | |
| 4,660,910 | A | 4/1987 | Sharp et al. | |
| 4,785,247 | A | 11/1988 | Meador et al. | |
| 4,788,544 | A | 11/1988 | Howard | |
| 4,806,928 | A | 2/1989 | Veneruso | |
| 4,884,071 | A | 11/1989 | Howard | |
| 4,901,069 | A | 2/1990 | Veneruso | |
| 4,953,136 | A | 8/1990 | Kamata et al. | |
| 5,008,664 | A | 4/1991 | More et al. | |
| 5,223,826 | A | 6/1993 | Amou et al. | |
| 5,336,997 | A | 8/1994 | Anim-Appiah et al. | |
| 5,337,002 | A | 8/1994 | Mercer | |
| 5,385,476 | A * | 1/1995 | Jasper | 439/38 |
| 5,744,877 | A | 4/1998 | Owens | |
| 5,928,546 | A | 7/1999 | Kramer et al. | |
| 6,123,561 | A | 9/2000 | Turner et al. | |
| 6,223,826 | B1 | 5/2001 | Chau et al. | |
| 6,367,564 | B1 | 4/2002 | Mills et al. | |
| 6,387,584 | B1 | 5/2002 | Ikeda | |
| 6,392,317 | B1 * | 5/2002 | Hall et al. | 307/90 |
| 6,402,524 | B2 | 6/2002 | Wurm et al. | |
| 6,446,728 | B2 | 9/2002 | Chau et al. | |
| 6,555,954 | B1 * | 4/2003 | Chandler et al. | 313/485 |
| 6,641,434 | B2 | 11/2003 | Boyle et al. | |
| 6,651,755 | B1 | 11/2003 | Kelpe | |
| 6,655,464 | B2 | 12/2003 | Chau et al. | |
| 6,670,880 | B1 * | 12/2003 | Hall et al. | 336/132 |
| 6,684,952 | B2 | 2/2004 | Brockman et al. | |
| 6,688,396 | B2 | 2/2004 | Floerke et al. | |
| 6,717,501 | B2 * | 4/2004 | Hall et al. | 336/132 |
| 6,727,827 | B1 | 4/2004 | Edwards et al. | |
| 6,739,413 | B2 | 5/2004 | Sharp et al. | |
| 6,799,632 | B2 | 10/2004 | Hall et al. | |
| 6,821,147 | B1 | 11/2004 | Hall et al. | |
| 6,830,467 | B2 | 12/2004 | Hall et al. | |
| 6,831,571 | B2 | 12/2004 | Bartel | |
| 6,844,498 | B2 | 1/2005 | Hall et al. | |
| 6,845,822 | B2 | 1/2005 | Chau | |
| 6,888,473 | B1 | 5/2005 | Hall et al. | |
| 6,913,093 | B2 | 7/2005 | Hall et al. | |
| 6,929,493 | B2 | 8/2005 | Hall et al. | |
| 6,945,802 | B2 | 9/2005 | Hall et al. | |
| 6,968,611 | B2 | 11/2005 | Hall et al. | |
| 6,981,546 | B2 | 1/2006 | Hall et al. | |
| 6,982,384 | B2 | 1/2006 | Hall et al. | |
| 6,991,035 | B2 | 1/2006 | Hall et al. | |
| 6,992,554 | B2 | 1/2006 | Hall et al. | |
| 7,002,445 | B2 | 2/2006 | Hall et al. | |
| 7,017,667 | B2 | 3/2006 | Hall et al. | |
| 7,019,665 | B2 | 3/2006 | Hall et al. | |
| 7,028,779 | B2 | 4/2006 | Chau | |
| 7,040,003 | B2 | 5/2006 | Hall et al. | |
| 7,041,908 | B2 | 5/2006 | Hall et al. | |
| 7,053,788 | B2 | 5/2006 | Hall et al. | |
| 7,064,676 | B2 | 6/2006 | Hall et al. | |
| 7,069,999 | B2 | 7/2006 | Hall et al. | |
| 7,080,998 | B2 | 7/2006 | Hall et al. | |
| 7,091,810 | B2 | 8/2006 | Hall et al. | |
| 7,098,767 | B2 | 8/2006 | Hall et al. | |
| 7,098,802 | B2 | 8/2006 | Hall et al. | |
| 7,123,160 | B2 | 10/2006 | Hall et al. | |
| 7,139,218 | B2 | 11/2006 | Hall et al. | |
| 7,142,129 | B2 | 11/2006 | Hall et al. | |
| 7,150,329 | B2 | 12/2006 | Chau | |
| 7,165,618 | B2 | 1/2007 | Brockman et al. | |
| 7,168,510 | B2 | 1/2007 | Boyle et al. | |
| 7,170,424 | B2 | 1/2007 | Vinegar et al. | |
| 7,190,280 | B2 | 3/2007 | Hall et al. | |
| 7,193,526 | B2 | 3/2007 | Hall et al. | |
| 7,193,527 | B2 | 3/2007 | Hall et al. | |
| 7,198,118 | B2 | 4/2007 | Hall et al. | |
| 7,201,240 | B2 | 4/2007 | Hall et al. | |
| 7,224,288 | B2 | 5/2007 | Hall et al. | |
| 7,243,717 | B2 | 7/2007 | Hall et al. | |
| 7,253,745 | B2 | 8/2007 | Hall et al. | |
| 7,259,689 | B2 | 8/2007 | Hernandez-Marti et al. | |
| 7,261,154 | B2 | 8/2007 | Hall et al. | |
| 7,277,025 | B2 | 10/2007 | Allan | |
| 7,277,026 | B2 | 10/2007 | Hall et al. | |
| 7,298,286 | B2 | 11/2007 | Hall | |
| 7,362,235 | B1 | 4/2008 | Norman | |
| 7,382,273 | B2 | 6/2008 | Hall et al. | |
| 7,453,768 | B2 | 11/2008 | Hall et al. | |
| 7,482,945 | B2 | 1/2009 | Hall | |
| 7,488,194 | B2 | 2/2009 | Hall et al. | |
| 7,504,963 | B2 | 3/2009 | Hall et al. | |
| 7,535,377 | B2 | 5/2009 | Hall et al. | |
| 7,537,053 | B1 | 5/2009 | Hall et al. | |
| 7,566,235 | B2 * | 7/2009 | Bottos et al. | 439/191 |
| 7,572,134 | B2 | 8/2009 | Hall et al. | |
| 7,586,934 | B2 | 9/2009 | Hall et al. | |
| 7,649,475 | B2 | 1/2010 | Hall et al. | |
| 7,817,062 | B1 | 10/2010 | Li et al. | |
| 7,931,054 | B2 | 4/2011 | Pozgay et al. | |
| 2001/0029780 | A1 | 10/2001 | Bartel | |
| 2001/0040379 | A1 | 11/2001 | Schultz et al. | |
| 2002/0050829 | A1 | 5/2002 | Xu | |
| 2002/0075114 | A1 * | 6/2002 | Hall et al. | 336/192 |
| 2002/0135179 | A1 | 9/2002 | Boyle et al. | |
| 2002/0193004 | A1 * | 12/2002 | Boyle et al. | 439/577 |
| 2003/0094282 | A1 | 5/2003 | Goode et al. | |
| 2004/0020644 | A1 | 2/2004 | Wilson et al. | |
| 2004/0104797 | A1 | 6/2004 | Hall et al. | |
| 2004/0108108 | A1 | 6/2004 | Bailey et al. | |
| 2004/0113808 | A1 | 6/2004 | Hall et al. | |
| 2004/0118608 | A1 | 6/2004 | Haci et al. | |
| 2004/0140128 | A1 | 7/2004 | Vail | |
| 2004/0145482 | A1 | 7/2004 | Anderson | |
| 2004/0145492 | A1 | 7/2004 | Hall et al. | |
| 2004/0149431 | A1 * | 8/2004 | Wylie et al. | 166/242.1 |
| 2004/0150532 | A1 | 8/2004 | Hall et al. | |
| 2004/0164636 | A1 | 8/2004 | Okamoto et al. | |
| 2004/0164833 | A1 | 8/2004 | Hall et al. | |
| 2004/0164838 | A1 | 8/2004 | Hall et al. | |
| 2004/0202047 | A1 | 10/2004 | Fripp et al. | |
| 2004/0216847 | A1 | 11/2004 | Hall et al. | |
| 2004/0217880 | A1 | 11/2004 | Clark et al. | |
| 2004/0244816 | A1 | 12/2004 | Luo | |
| 2004/0244916 | A1 | 12/2004 | Hall et al. | |
| 2004/0244964 | A1 | 12/2004 | Hall et al. | |
| 2004/0246142 | A1 * | 12/2004 | Hall et al. | 340/854.9 |
| 2005/0001730 | A1 | 1/2005 | Alderman | |
| 2005/0001735 | A1 | 1/2005 | Hall et al. | |
| 2005/0001736 | A1 | 1/2005 | Hall et al. | |
| 2005/0001738 | A1 | 1/2005 | Hall et al. | |
| 2005/0035874 | A1 | 2/2005 | Hall et al. | |
| 2005/0035875 | A1 | 2/2005 | Hall et al. | |
| 2005/0035876 | A1 | 2/2005 | Hall et al. | |
| 2005/0036507 | A1 | 2/2005 | Hall et al. | |
| 2005/0039912 | A1 | 2/2005 | Hall et al. | |
| 2005/0045339 | A1 | 3/2005 | Hall et al. | |
| 2005/0046586 | A1 | 3/2005 | Hall et al. | |
| 2005/0046590 | A1 | 3/2005 | Hall et al. | |
| 2005/0067159 | A1 | 3/2005 | Hall et al. | |
| 2005/0070144 | A1 | 3/2005 | Hall et al. | |
| 2005/0082082 | A1 | 4/2005 | Walter et al. | |
| 2005/0082092 | A1 | 4/2005 | Hall et al. | |
| 2005/0092499 | A1 | 5/2005 | Hall et al. | |
| 2005/0093296 | A1 | 5/2005 | Hall et al. | |
| 2005/0095827 | A1 | 5/2005 | Hall et al. | |

| | | |
|---|---|---|
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0150853 A1 | 7/2005 | Kimball |
| 2005/0161215 A1 | 7/2005 | Hall et al. |
| 2005/0173128 A1 | 8/2005 | Hall et al. |
| 2005/0190584 A1 | 9/2005 | Hernandez-Marti et al. |
| 2005/0200498 A1* | 9/2005 | Gleitman .................. 340/854.4 |
| 2005/0212530 A1 | 9/2005 | Hall et al. |
| 2005/0236160 A1 | 10/2005 | Hall et al. |
| 2005/0284662 A1 | 12/2005 | Hall et al. |
| 2005/0285705 A1* | 12/2005 | Hall et al. .................... 336/132 |
| 2006/0038699 A1 | 2/2006 | Dodge et al. |
| 2006/0048586 A1 | 3/2006 | Sanada et al. |
| 2006/0113803 A1 | 6/2006 | Hall et al. |
| 2006/0124291 A1 | 6/2006 | Chau |
| 2006/0126249 A1 | 6/2006 | Boling |
| 2006/0129339 A1 | 6/2006 | Bruno |
| 2006/0187084 A1 | 8/2006 | Hernandez-Marti et al. |
| 2006/0236160 A1 | 10/2006 | Ueda et al. |
| 2007/0017671 A1 | 1/2007 | Clark et al. |
| 2007/0018848 A1 | 1/2007 | Bottos et al. |
| 2007/0030167 A1 | 2/2007 | Li et al. |
| 2007/0102197 A1 | 5/2007 | Rotthaeuser |
| 2007/0137853 A1 | 6/2007 | Zhang et al. |
| 2008/0041575 A1 | 2/2008 | Clark et al. |
| 2008/0047703 A1 | 2/2008 | Stoesz et al. |
| 2009/0151926 A1 | 6/2009 | Hall et al. |
| 2009/0151932 A1 | 6/2009 | Hall et al. |
| 2009/0212970 A1 | 8/2009 | Hall et al. |

OTHER PUBLICATIONS

Hughes, Edward, "Determination of the Final Temperature-Rise of Electrical Machines from Heating Tests of Short Duration," 68(403) *Journal of the Institution of Electrical Engineers* 932-941 (Jul. 1930).

Office Action from co-pending U.S. Appl. No. 12/390,353, dated Oct. 21, 2011, 10 pages.

* cited by examiner

1400

```
┌─────────────────────────────────────────────┐
│ Provide a downhole tool string component    │
│ and an adjacent tool string component       │
│ respectively comprising an annular          │
│ magnetic coupler and an adjacent annular    │
│ magnetic coupler disposed in an annular     │
│ recess in a shoulder of an end of the       │
│ component.                          1401    │
└─────────────────────────────────────────────┘
                      │
┌─────────────────────────────────────────────┐
│ Adapt the shoulders of the downhole tool    │
│ string component and the adjacent tool      │
│ string component to abut one another when   │
│ the ends of the components are              │
│ mechanically connected to one another.      │
│                                     1402    │
└─────────────────────────────────────────────┘
                      │
┌─────────────────────────────────────────────┐
│ Mechanically connect the ends of the        │
│ components to one another.                  │
│                                     1403    │
└─────────────────────────────────────────────┘
                      │
┌─────────────────────────────────────────────┐
│ Drive an alternating electrical current     │
│ through the magnetic coupler at a           │
│ frequency of between 10 and 100 kHz.        │
│                                     1404    │
└─────────────────────────────────────────────┘
```

Fig. 14

DOWNHOLE COILS

CROSS REFERENCE TO RELATED APPLICATIONS

This application is a continuation of U.S. patent application Ser. No. 11/860,761, filed on Sep. 25, 2007, which is a continuation-in-part of U.S. patent application Ser. No. 11/739,344 filed on Apr. 24, 2007 which is now U.S. Pat. No. 7,504,963 issued on Mar. 17, 2009 entitled "System and Method for Providing Electrical Power Downhole." U.S. patent application Ser. No. 11/739,344 is a continuation-in-part of U.S. patent application Ser. No. 11/421,387 filed on May 31, 2006 which is now U.S. Pat. No. 7,535,377 issued on May 19, 2009 entitled, "Wired Tool String Component." U.S. patent application Ser. No. 11/421,387 is a continuation-in-part of U.S. patent application Ser. No. 11/421,357 filed on May 31, 2006 which is now U.S. Pat. No. 7,382,273 issued on Jun. 3, 2008 entitled, "Wired Tool String Component." U.S. patent application Ser. No. 11/421,357 is a continuation in-part of U.S. patent application Ser. No. 11/133,905 filed on May 21, 2005 which is now U.S. Pat. No. 7,277,026 issued on Oct. 2, 2007 entitled, "Downhole Component with Multiple Transmission Elements." All of these applications are herein incorporated by reference for all that they contain.

BACKGROUND

The present invention relates to downhole drilling, and more particularly, to systems and methods for transmitting power to components of a downhole tool string. Downhole sensors, tools, telemetry components and other electronic components continue to increase in both number and complexity in downhole drilling systems. Because these components require power to operate, the need for a reliable energy source to power these downhole components is becoming increasingly important. Constraints imposed by downhole tools and the harsh downhole environment significantly limit options for generating and providing power to downhole components.

Batteries provide one potential energy source to power downhole components. Batteries, however, may be hindered by their inherent finite life and the need for frequent replacement and/or recharging. This may be especially problematic in downhole drilling applications where access to batteries requires stripping and disassembly of the tool string. Battery function may also be impaired by extreme temperatures, pressures, or other conditions found downhole. Many types of batteries may be unable to reliably operate in downhole conditions. Furthermore, batteries may be required everywhere electronic equipment is located downhole, requiring large numbers of batteries and significant time for installation and replacement.

Another approach is to transmit power along the tool string using cables or other transmission media. For example, power may be generated at or near the ground's surface and then transmitted to various downhole components along the tool string. This approach, however, also have its own problems and limitations. Because a tool string may extend 20,000 feet or more into the ground, power transmitted along transmission lines may attenuate to an unacceptable level before it reaches its destination.

Attenuation may occur not only in transmission lines, but in components used to transmit power across tool joints of a tool string. Because a tool string may include many hundreds of sections of drill pipe and a roughly equal number of tool joints, a power signal may attenuate significantly after traveling a relatively short distance along the tool string. In view of the foregoing, what is needed is a system and method for reliably transmitting power to downhole sensors, tools, telemetry components and other electronic components in a downhole drilling system. Ideally, such a system and method would mitigate the problems with signal attenuation which may be present in some power transmission systems. A suitable system and method should also be able to provide reliable operation in extreme temperatures, pressures, and corrosive conditions encountered downhole.

As downhole instrumentation and tools have become increasingly more complex in their composition and versatile in their functionality, the need to transmit power and/or data through tubular tool string components is becoming ever more significant. Real-time logging tools located at a drill bit and/or throughout a tool string require power to operate. Providing power downhole is challenging, but if accomplished it may greatly increase the efficiency of drilling. Data collected by logging tools are even more valuable when they are received at the surface real time.

Many attempts have been made to provide high-speed data transfer or usable power transmission through tool string components. One technology developed involves using inductive couplers to transmit an electric signal across a tool joint. U.S. Pat. No. 2,414,719 to Cloud discloses an inductive coupler positioned within a downhole pipe to transmit a signal to an adjacent pipe.

U.S. Pat. No. 4,785,247 to Meador discloses an apparatus and method for measuring formation parameters by transmitting and receiving electromagnetic signals by antennas disposed in recesses in a tubular housing member and including apparatus for reducing the coupling of electrical noise into the system resulting from conducting elements located adjacent the recesses and housing.

U.S. Pat. No. 4,806,928 to Veneruso describes a downhole tool adapted to be coupled in a pipe string and positioned in a well that is provided with one or more electrical devices cooperatively arranged to receive power from surface power sources or to transmit and/or receive control or data signals from surface equipment. Inner and outer coil assemblies arranged on ferrite cores are arranged on the downhole tool and a suspension cable for electromagnetically coupling the electrical devices to the surface equipment is provided.

U.S. Pat. No. 6,670,880 to Hall also discloses the use of inductive couplers in tool joints to transmit data or power through a tool string. The '880 patent teaches of having the inductive couplers lying in magnetically insulating, electrically conducting troughs. The troughs conduct magnetic flux while preventing resultant eddy currents. U.S. Pat. No. 6,670,880 is herein incorporated by reference for all that it discloses.

U.S. patent application Ser. No. 11/133,905, also to Hall, discloses a tubular component in a downhole tool string with first and second inductive couplers in a first end and third and fourth inductive couplers in a second end. A first conductive medium connects the first and third couplers and a second conductive medium connects the second and fourth couplers. The first and third couplers are independent of the second and fourth couplers. U.S. patent application Ser. No. 11/133,905 is herein incorporated by reference for all that it discloses.

BRIEF SUMMARY

In one aspect of the invention, a downhole tool string component comprises a tubular body with at least one end adapted for threaded connection to an adjacent tool string component. The at least one end comprises at least one shoulder adapted to abut an adjacent shoulder of an adjacent end of the adjacent tool string component. An annular inductive coupler is disposed within an annular recess formed in the at least one shoulder, and the inductive coupler comprises a coil in electrical communication with an electrical conductor that is in electrical communication with an electronic device secured to the tubular body. The coil comprises a plurality of windings of wire strands that are electrically isolated from one another and which are disposed in an annular trough of magnetic material secured within the annular recess.

The coil wire may comprise a gauge of between 36 and 40 AWG, and may comprise between 1 and 15 coil turns. The coil wire may comprise between 5 and 40 wire strands. The wire strands may be interwoven. The coil may comprise the characteristic of increasing less than 35° Celsius when 160 watts are passed through the coil. In some embodiments the coil may comprise the characteristic of increasing less than 20° C. when 160 watts are passed through the coil.

The adjacent shoulder of the adjacent downhole tool string may comprise an adjacent inductive coupler configured similar to the inductive coupler. These couplers may be adapted to couple together when the downhole components are connected together at their ends. The inductive coupler and the adjacent inductive coupler may then be adapted to induce magnetic fields in each other when their coils are electrically energized. In such embodiments the inductive coupler may comprise a characteristic of transferring at least 85% energy from the inductive coupler to the adjacent inductive coupler when 160 watts are passed through the coil.

The electronic device that is secured to the tubular body may be a power source. The power source may comprise a battery, generator, capacitor, motor, or combinations thereof. In some embodiments the electronic device may be a sensor, drill instrument, logging-while-drilling tool, measuring-while-drilling tool, computational board, or combinations thereof.

The magnetic material may comprise a material selected from the group consisting of ferrite, a nickel alloy, a zinc alloy, a manganese alloy, soft iron, a silicon iron alloy, a cobalt iron alloy, a mu-metal, a laminated mu-metal, barium, strontium, carbonate, samarium, cobalt, neodymium, boron, a metal oxide, rare earth metals, and combinations thereof. The magnetic material may comprise a relative magnetic permeability of between 100 and 20000.

In another aspect of the invention, a method of transferring power from a downhole tool string component to an adjacent tool string component comprises a step of providing a downhole tool string component and an adjacent tool string component. The components respectively comprise an annular inductive coupler and an adjacent annular inductive coupler disposed in an annular recess in a shoulder of an end of the component. The method further comprises adapting the shoulders of the downhole tool string component and the adjacent tool string component to abut one another when the ends of the components are mechanically connected to one another. The method also comprises a step of mechanically connecting the ends of the components to one another and a step of driving an alternating electrical current through the inductive coupler at a frequency of between 10 and 100 kHz. In some embodiments the frequency may be between 50 and 79 kHz. In some embodiments a square wave may be used. The square wave may be a 170-190 volt square wave.

The inductive coupler and the adjacent inductive coupler may be respectively disposed within annular troughs of magnetic material that are disposed within the respective annular recess of the downhole and adjacent components. At least one of the inductive coupler and adjacent inductive coupler may comprise a coil that comprises a plurality of windings of wire strands, the wire strands each being electrically isolated from one another. At least 85% of the energy comprised by the alternating electrical current being driven through the annular inductive coupler may be inductively transferred to the adjacent inductive coupler when 160 watts are passed through the coil. In some embodiments at least 95% of the energy comprised by the alternating electrical current being driven through the annular inductive coupler may be inductively transferred to the adjacent inductive coupler when 160 watts are passed through the coil.

BRIEF DESCRIPTION OF THE DRAWINGS

FIG. 14 is a flowchart disclosing an embodiment of a method of transferring power between tool string components.

DETAILED DESCRIPTION

Figure 1:
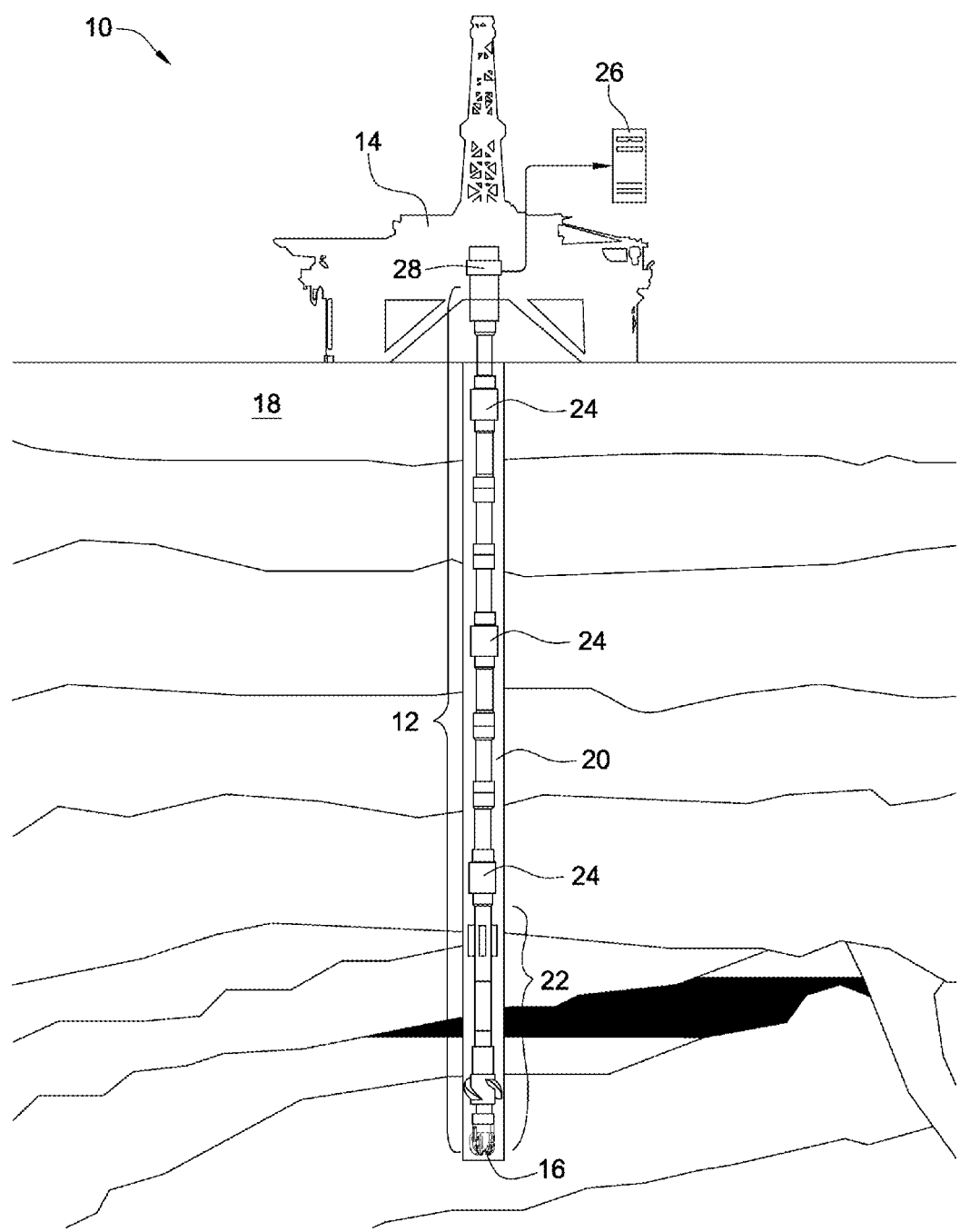
FIG. 1 is a cross-sectional view of a formation disclosing an orthogonal view of a tool string.

Referring to FIG. 1, one embodiment of a downhole drilling system 10 for use with the present invention includes a tool string 12 having multiple sections of drill pipe and other downhole tools. The tool string 12 is typically rotated by a drill rig 14 to turn a drill bit 16 that is loaded against a formation 18 to form a borehole 20. Rotation of the drill bit 16 may alternatively be provided by other downhole tools such as drill motors or drill turbines located adjacent to the drill bit 16.

The tool string 12 includes a bottom-hole assembly 22 which may include the drill bit 16 as well as sensors and other downhole tools such as logging-while-drilling ("LWD") tools, measurement-while-drilling ("MWD") tools, diagnostic-while-drilling ("DWD") tools, or the like. The bottom-hole assembly 22 may also include other downhole tools such as heavyweight drill pipe, drill collar, crossovers, mud motors, directional drilling equipment, stabilizers, hole openers, sub-assemblies, under-reamers, drilling jars, drilling shock absorbers, and other specialized devices.

While drilling, a drilling fluid is typically supplied under pressure at the drill rig 14 through the tool string 12. The drilling fluid typically flows downhole through a central bore of the tool string 12 and then returns up-hole to the drill rig 14 through an annulus 20 about the tool string 12. Pressurized drilling fluid is circulated around the drill bit 16 to provide a flushing action to carry cuttings to the surface.

To transmit information at high speeds along the tool string 12, a telemetry network comprising multiple network nodes 24 may be integrated into the tool string 12. These network nodes 24 may be used as repeaters to boost a data signal at regular intervals as the signal travels along the tool string 12. The nodes 24 may also be used to interface with various types of sensors to provide points for data collection along the tool string 12. The telemetry network may include a top-hole server 26, also acting as a network node, which may interface with the tool string 12 using a swivel device 28 for transmitting data between the tool string 12 and the server 26. The top-hole server 26 may be used to transfer data and tool commands to and from multiple local and remote users in real time. To transmit data between each of the nodes 24 and the server 26, data couplers and high-speed data cable may be incorporated into the drill pipe and other downhole tools making up the tool string 12. In selected embodiments, the data couplers may be used to transmit data across the tool joint interfaces by induction and without requiring direct electrical contact between the couplers.

One embodiment of a downhole telemetry network is described in U.S. Pat. No. 6,670,880 entitled Downhole Data Transmission System, having common inventors with the present invention, which this specification incorporates by reference. The telemetry network described in the above-named application enables high-speed bi-directional data transmission along the tool string 12 in real-time. This provides various benefits including but not limited to the ability to control downhole equipment, such as rotary steerable systems, instantaneously from the surface. The network also enables transmission of full seismic waveforms and logging-while-drilling images to the surface in real time and communication with complex logging tools integrated into the tool string 12 without the need for wireline cables. The network further enables control of downhole tools with precision and in real time, access to downhole data even during loss of circulation events, and monitoring of pressure conditions, hole stability, solids movement, and influx migration in real time. The use of the abovementioned equipment may require the ability of passing power between segments of the tool string 12.

Figure 2:
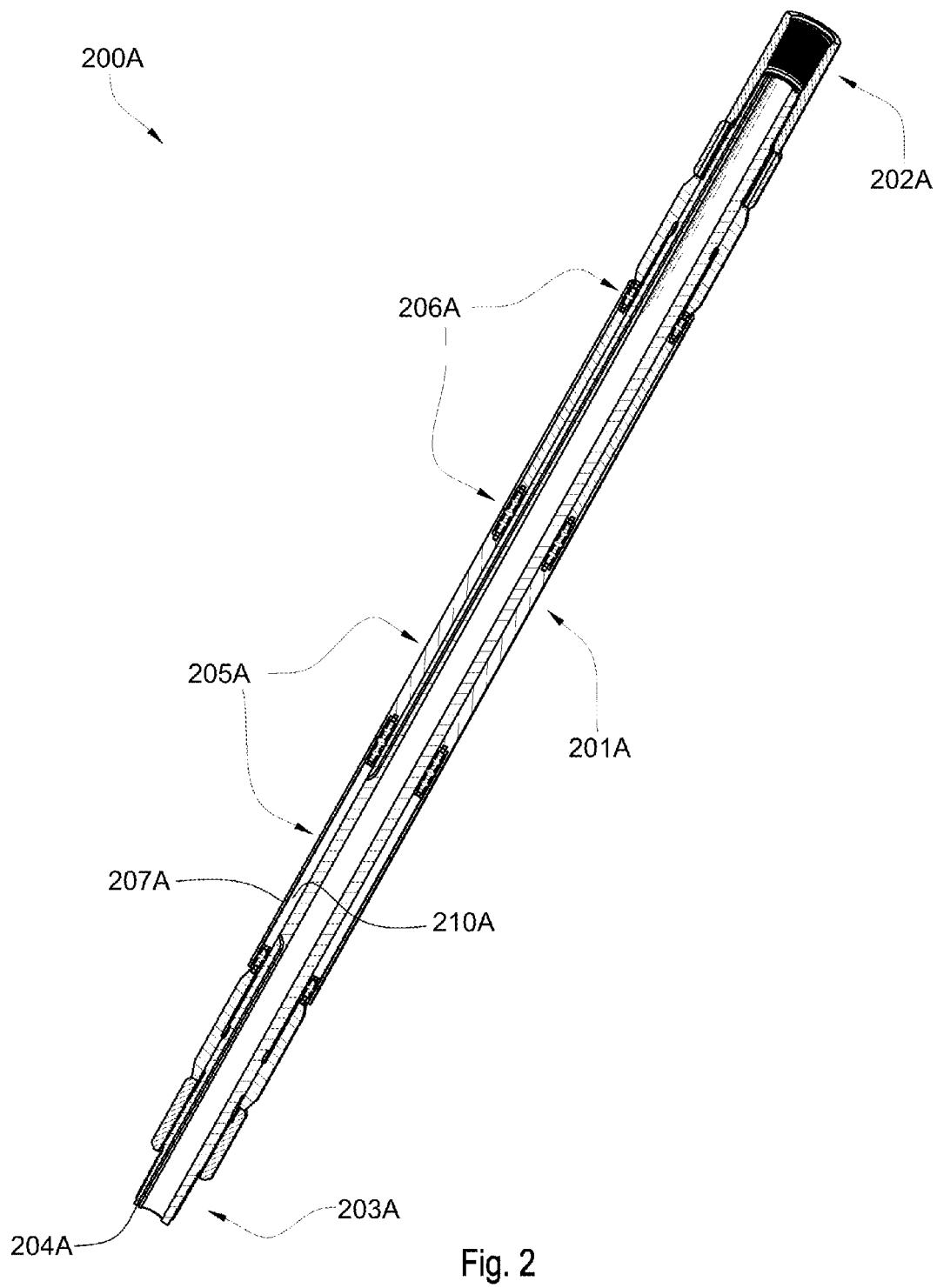
FIG. 2 is a cross-sectional diagram of an embodiment of tool string component.

Referring now to FIG. 2, a downhole tool string component 200 of the tool string 12 of FIG. 1 comprises a tubular body 201A with a box end 202A and a pin end 203A, with each end 202A, 203A being adapted for threaded connection to an adjacent tool string component (not shown). Both ends 202A, 203A have a shoulder 204A that is adapted to abut an adjacent shoulder of an adjacent end of the adjacent tool string component. The downhole tool string component 200A may have a plurality of pockets 205A. The pockets 205A may be formed by a plurality of flanges 206A disposed around the downhole tool string component 200A at different axial locations and covered by individual sleeves 207A disposed between and around the flanges 206A. A pocket 205A may be formed around an outer surface of the tubular body 201A by a sleeve 207A disposed around the tubular body 201A such that opposite ends of the sleeve 207A fit around at least a portion of a first flange 206A and a second flange 206A. The sleeves 207A may be interlocked or keyed together near the flanges 206A for extra torsional support. At least one sleeve 207A may be made of a non-magnetic material, which may be useful in embodiments using magnetic sensors or other electronics. The pockets 205A may be sealed by a sleeve 207A.

Electronic equipment may be disposed within at least one of the pockets 205A of the downhole tool string component 200A. The electronics may be in electrical communication with the aforementioned telemetry system, or they may be part of a closed-loop system downhole. An electronic device 210A is secured to the tubular body 201A and may be disposed within at least one of the pockets 205A, which may protect the device 210A from downhole conditions. The electronic device 210A may comprise sensors for monitoring downhole conditions. The sensors may include pressure sensors, strain sensors, flow sensors, acoustic sensors, temperature sensors, torque sensors, position sensors, vibration sensors, geophones, hydrophones, electrical potential sensors, nuclear sensors, or any combination thereof. In some embodiments of the invention the electronic device 210A may be a sensor, drill instrument, logging-while drilling tool, measuring-while drilling too, computational board, or combinations thereof. Information gathered from the sensors may be used either by an operator at the surface or by the closed-loop system downhole for modifications during the drilling process. If electronics are disposed in more than one pocket 205A, the pockets 205A may be in electrical communication, which may be through an electrically conductive conduit disposed within the flange separating them. The information may be sent directly to the surface without any computations taking place downhole. In some embodiments the electronic device may be a sonic tool. The sonic tool may comprise multiple poles and may be integrated directly into the tool string. Sending all of the gathered information from the sonic tool directly to the surface without downhole computations may eliminate the need for downhole electronics which may be expensive. The surface equipment may in some cases by able to process the data quicker since the electronics up-hole is not being processed in a high temperature, high pressure environment.

Figures 3, 3A:
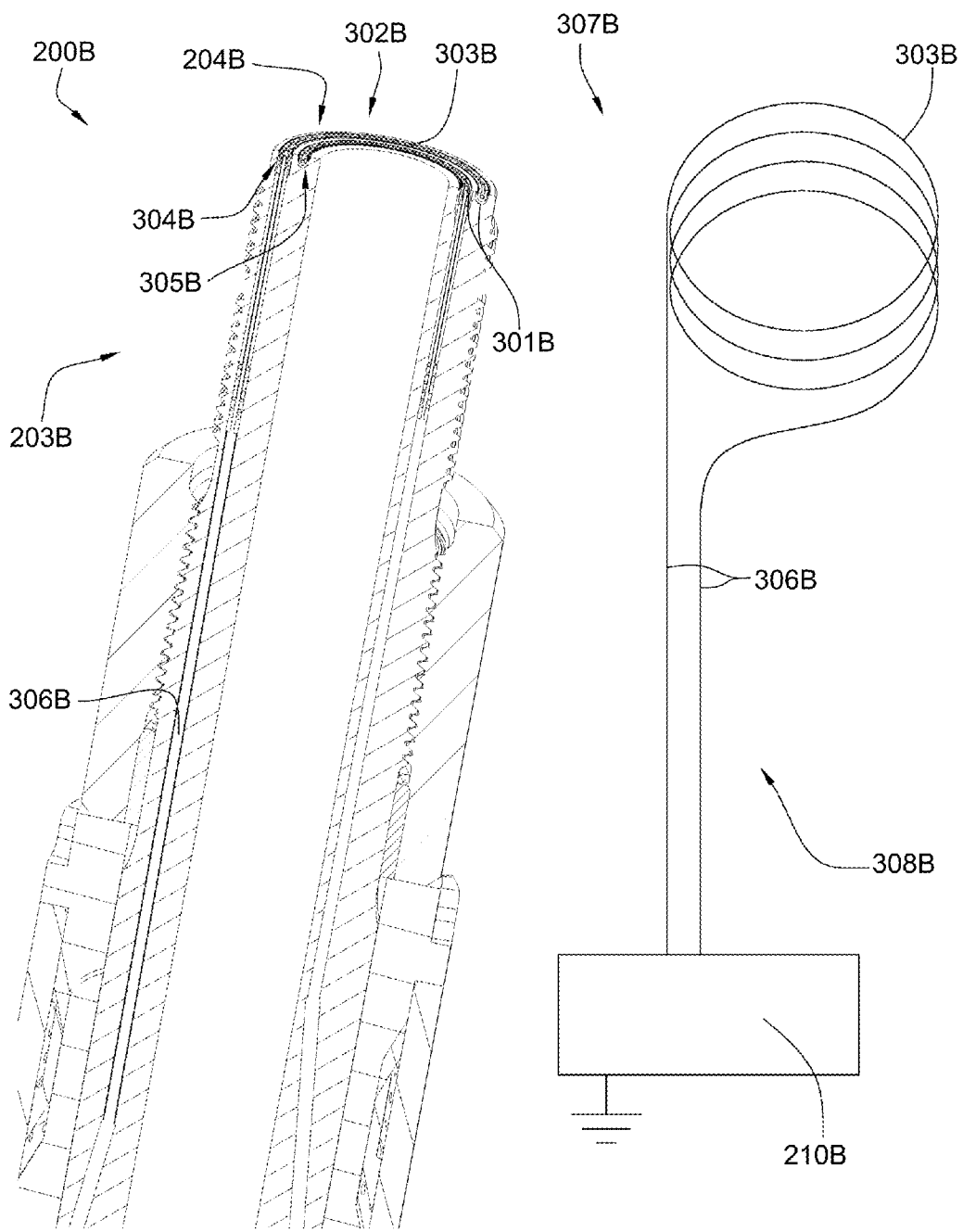
FIG. 3 is a cross-sectional diagram of another embodiment of a tool string component.
FIG. 3a is an electrical schematic of an embodiment of an electrical circuit.

Referring now to FIG. 3 and FIG. 3a, FIG. 3 discloses a pin end 203B of an embodiment of a downhole tool string component 200B having a plurality of annular recesses 301B formed in a shoulder 204B. In some embodiments the shoulder 204B may comprise a single recess 301B. An annular inductive coupler 302 is disposed within each recess 301B and comprises a coil 303B. A first inductive coupler 304B may be optimized for the transfer of power and a second inductive coupler 305B may be optimized for the transfer of data. Referring to the coil 303B disposed in the first coupler 304B, the coil 303B is in electrical communication with the electronic device 210B via an electrical conductor 306B. An electrical circuit 307B comprises the electronic device 210B, the annular coil 303B disposed in the first coupler 304B, and two electrical conductors 306B that are disposed intermediate, or between, the electronic device 210B and the coil 303B and which are in electrical communication with both the electronic device 210B and the coil 303B. A portion 308B of the electrical circuit 307B comprises the coil 303B and the two electrical conductors 306B, and in some embodiments may not comprise the electronic device 210B. The portion 308B is electrically isolated from the tubular body 201B of the component 200B.

Figure 4:
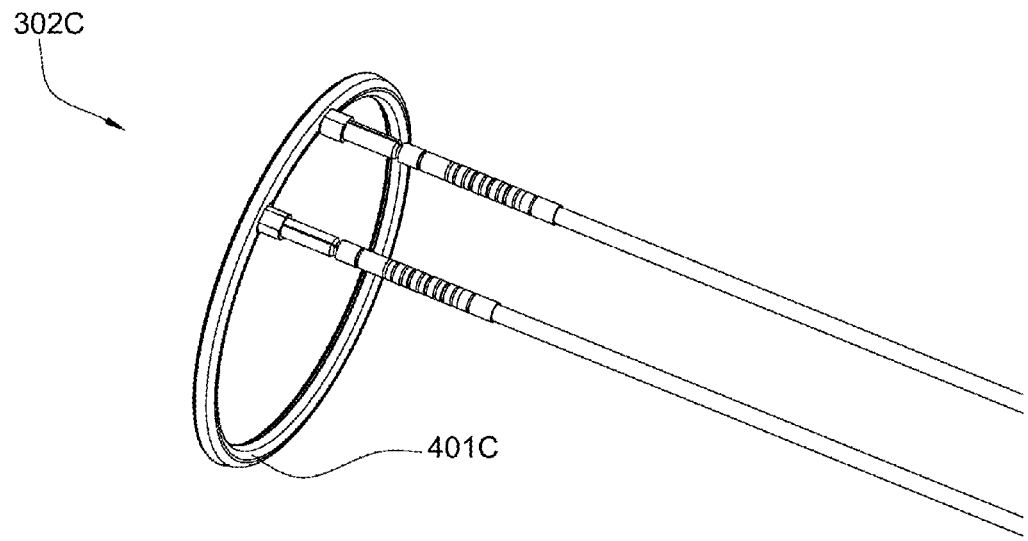
FIG. 4 is a perspective diagram of an embodiment of an inductive coupler.
Figure 5:
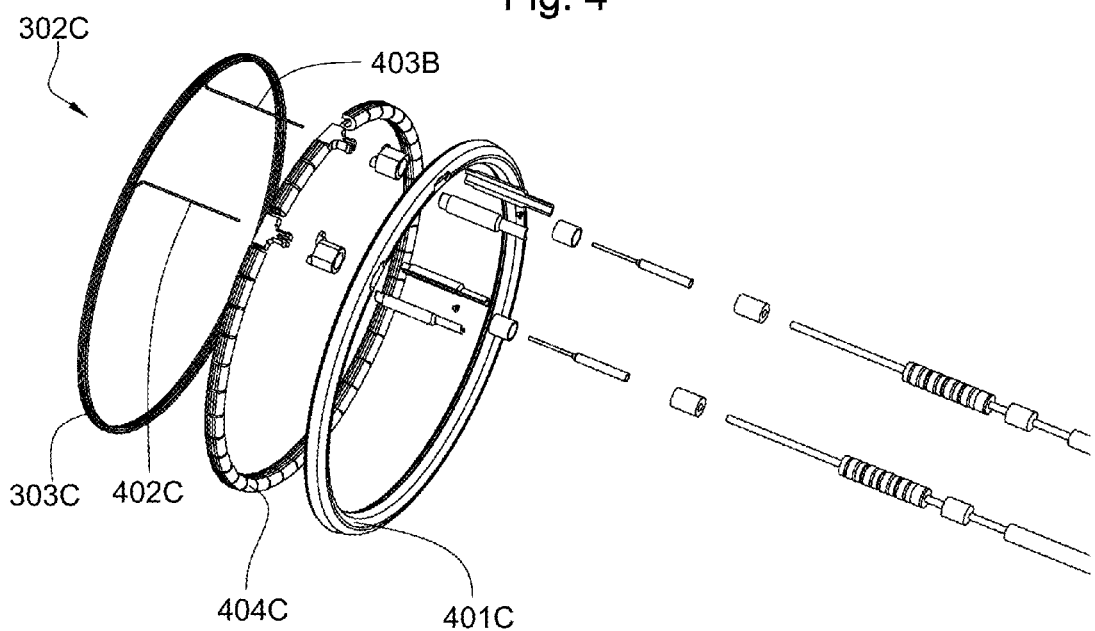
FIG. 5 is an exploded diagram of an embodiment of an inductive coupler.

FIGS. 4 and 5 respectively disclose a perspective view and an exploded view of an embodiment of an inductive coupler 302C. The inductive coupler 302C comprises a housing ring 401C, a first lead 402C and a second lead 403C. The housing ring 401C may comprise a durable material such as steel. In the present embodiment the first lead 402C and the second lead 403C are proximate one another. The first lead 402C and the second lead 403C are adapted to electrically communicate with electrical conductors such as the two electrical conductors 306B disclosed in FIG. 3. In the embodiments of FIGS. 4 and 5, the leads 402C, 403C and their corresponding electrical conductors are disposed proximate one another. The inductive coupler 302C also comprises a coil 303C and an annular trough 404C made of magnetic material. The magnetic material may comprise a composition selected from the group consisting of ferrite, a nickel alloy, a zinc alloy, a manganese alloy, soft iron, a silicon iron alloy, a cobalt iron alloy, a mu-metal, a laminated mu-metal, barium, strongtium, carbonate, samarium, cobalt, neodymium, boron, a metal oxide, rare earth metals, Fe, Cu, Mo, Cr, V, C, Si, molypermalloys, metallic powder suspended in an electrically insulating material, and combinations thereof. The magnetic material may comprise a relative magnetic permeability of between 100 and 20000. The coil 303C may comprise an electrically conductive material such as copper. When an alternating electrical current is passed through the coil 303C an inductive signal may be generated. The coil 303C may comprise a characteristic of increasing less than 35 degrees Celsius (.degree. C.) when 160 watts of power are passed through the coil 303. In some embodiments the coil 303 may increase less than 20.degree. C. when 160 watts are passed through it.

Figure 6:
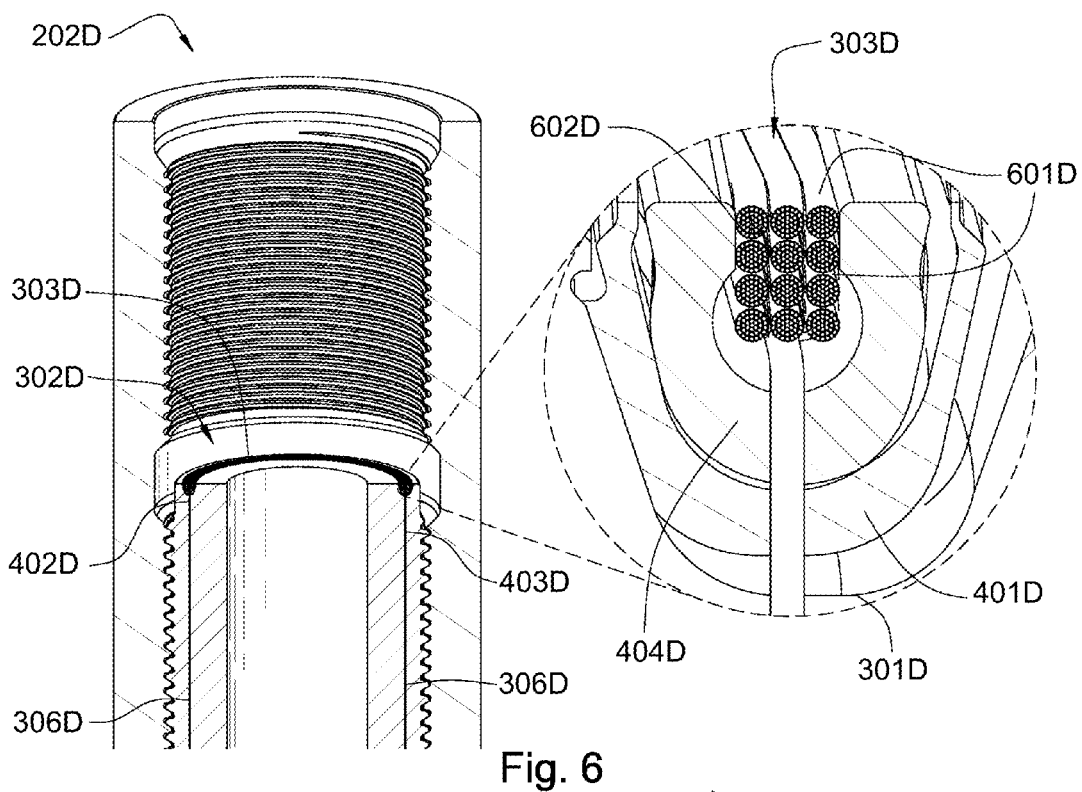
FIG. 6 is a cross-sectional diagram of an embodiment of an inductive coupler disposed in a tool string component.
Figure 7:
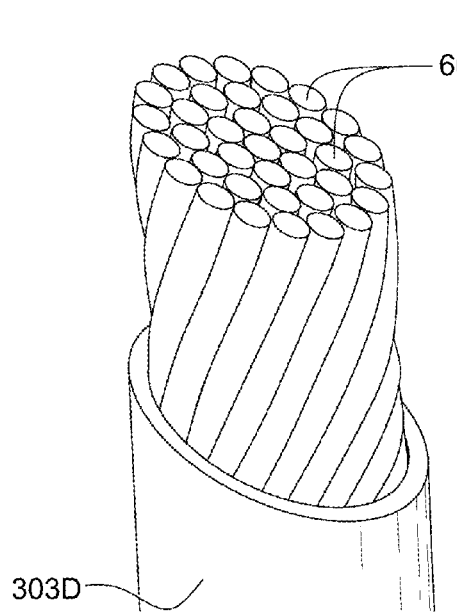
FIG. 7 is a perspective diagram of an embodiment of a coil comprising a plurality of electrically isolated wire strands.
Figure 8:
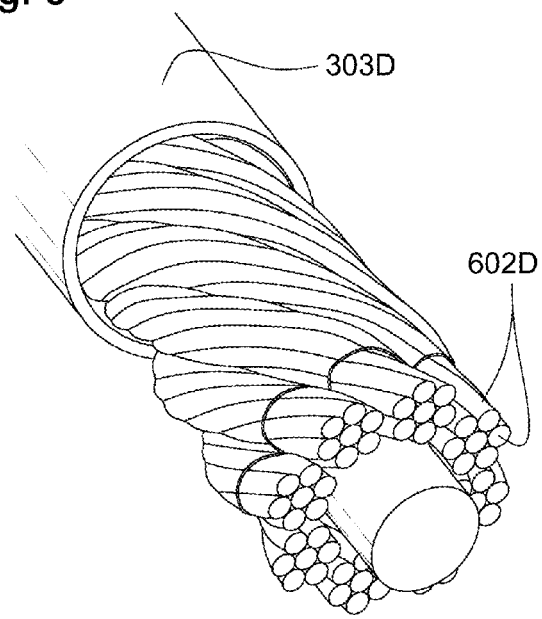
FIG. 8 is a perspective diagram of another embodiment of a coil comprising a plurality of electrically isolated wire strands.

Referring now to FIGS. 6-8, inductive coupler 302D comprises a coil 303D having a plurality of windings 601D of wire strands 602D that are each electrically isolated from one another. The wire strands 602D are disposed in the annular trough 404D of magnetic material that is secured within the annular recess 301D. As disclosed in FIGS. 7 and 8, the wire strands 602D may be interwoven. In some embodiments each coil 303D may comprise between 5 and 40 wire strands 602D and between 1 and 15 coil turns. In the present application, windings 601D and coil turns may be used interchangeably. The coil 303D may comprise a gauge between 36 and 40 American Wire Gauge (AWG). In the present embodiment a first lead 402 and a second lead 403 of the inductive coupler 302D and their corresponding electrical conductors are disposed on opposite sides of the inductive coupler 302D. In some embodiments, the wire strands 602D are collectively wrapped with an insulator and in some embodiments, no insulator is required. A filler material such as Teflon®, (i.e. polytetrafluoroethlyene, fluoropolymer, and other fluoropolymers,) or an epoxy may be used to fill the gaps in the inductive couplers 302D, such as the gaps between the coil 303D and the annular trough 404D, and the annular trough 404D and the annular recess 301D, and so forth.

Figure 9:
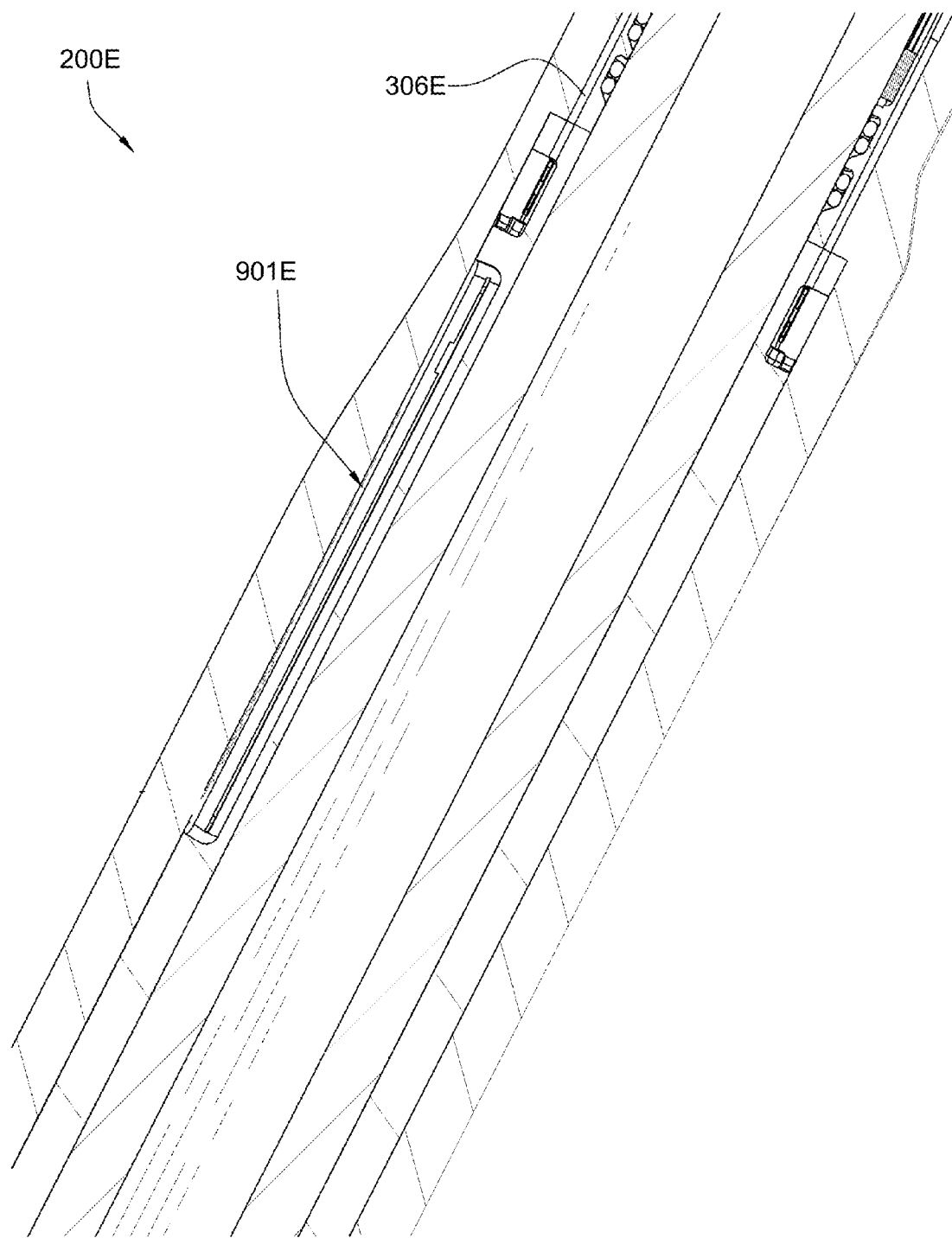
FIG. 9 is a cross-sectional diagram of a tool string component having an embodiment of an electronic device.

FIG. 9 discloses an embodiment of a downhole drill string component 200E in which an electronic device 210E is a computational board 901E. The computational board 901E is in electrical communication with both a first lead 402E and a second lead 403E of the inductive coupler 302E through an electrical conductor 306E. The computational board 901E may send and receive electrical signals to and from other electrical equipment associated with the drilling operation through the downhole network.

Figure 10:
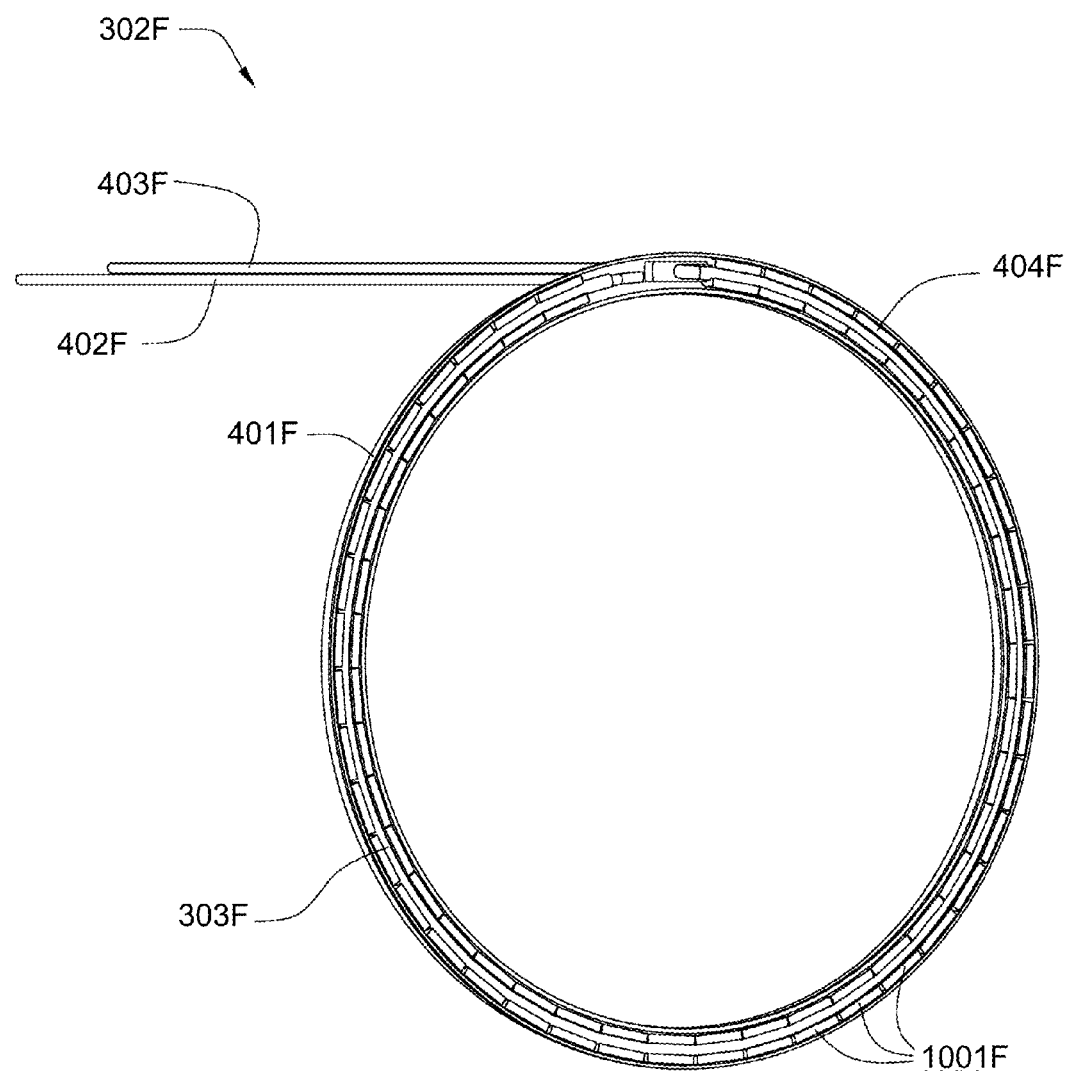
FIG. 10 is a perspective diagram of an embodiment of an inductive coupler.

FIG. 10 is a perspective diagram of an inductive coupler 302F in which a first lead 402F and a second lead 403F are proximate one another. FIG. 10 also shows an embodiment in which an annular trough 404F of magnetic material comprises a plurality of segments 1001F of magnetic material that are each disposed intermediate, or between, the coil 303F and the ring housing 401F.

Figure 11:
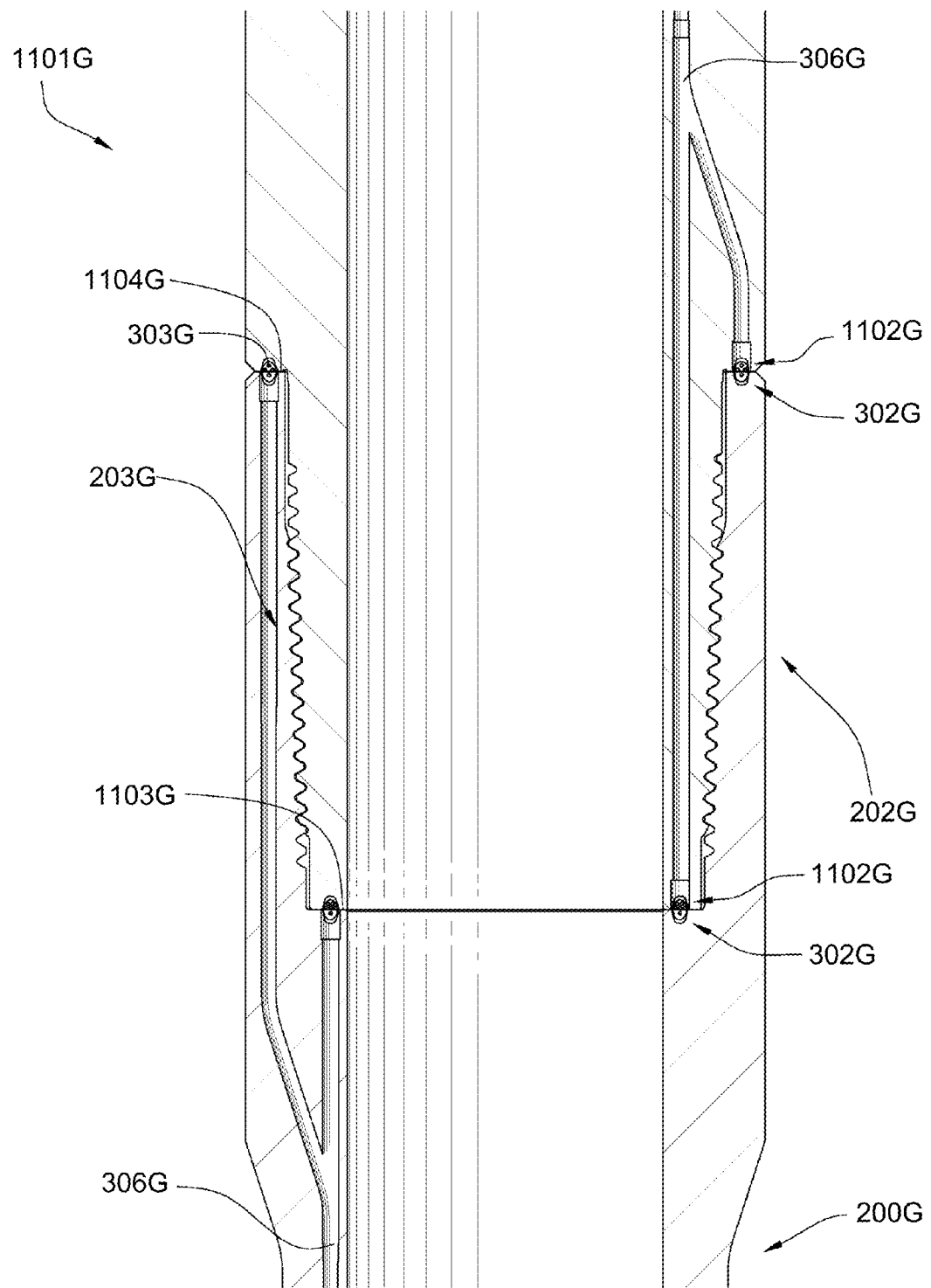
FIG. 11 is a cross-sectional diagram of an embodiment of a tool string component connected to an adjacent tool string component.

Referring now to FIG. 11, an embodiment is shown in which a downhole component 200G is connected at its box end 202G to a pin end 203G of an adjacent tool string component 1101G. The adjacent tool string component 1101G comprises an adjacent inductive coupler 1102G that is configured similar to the inductive coupler 302G of the downhole tool string component 200G. The inductive couplers 302G, 1102G are adapted to couple when the components 200G, 1101G are connected together at their ends 202G, 203G. The inductive couplers 302G, 1102G are adapted to induce magnetic fields in each other when their coils 303G are electrically energized. Specifically, passing an alternating electrical current through the coil 303G of either inductive coupler 302G, 1102G, induces a magnetic field in the other coupler 1102G, 302G. This induced magnetic field is believed to induce an alternating electrical current in the induced coil 303G. In some embodiments, when 160 watts are passed through one of the couplers 302G, 1102G, at least 136 watts are induced in other coupler 1102G, 302G. In other words, the inductive coupler 302G may comprise a characteristic of transferring at least 85% of its energy input into the adjacent coupler 1102G. In some embodiments the inductive coupler 302G may transfer at least 95% of its input energy into the adjacent coupler 1102G.

FIG. 11 also discloses tool string components 200G, 1101G comprising both primary and secondary shoulders 1103G, 1004G. In the present embodiment an inductive coupler 302G is disposed in each of the primary and secondary shoulders 1103G, 1004G. In some embodiments only the primary shoulder 1103G or only the secondary shoulder 1104G may comprise a inductive coupler 302G. In embodiments where each of the primary and secondary shoulders 1103G, 1004G comprises a inductive coupler 302G, each inductive coupler 302G may transfer energy at a different optimal frequency. This may be accomplished by providing the first and second coils 303G with different geometries which may differ in the number of windings 601G, diameter, type of material, surface area, length, or combinations thereof. The annular troughs 404G of the couplers 302G, 1102G may also comprise different geometries as well. The inductive couplers 302G, 1102G may act as band pass filters due to their inherent inductance, capacitance and resistance such that a first frequency is allowed to pass at a first resonant frequency, and a second frequency is allowed to pass at a second resonant frequency. Preferably, the signals transmitting through the electrical conductors 306G may have frequencies at or about at the resonant frequencies of the band pass filters. By configuring the signals to have different frequencies, each at one of the resonant frequencies of the couplers 302G, the signals may be transmitted through one or more tool string components and still be distinguished from one another. In FIG. 11, the coils 303G disposed in the inductive couplers 302G in the primary and secondary shoulders 1103G, 1104G of the tool string component each comprise a single winding 601G, while the coils 303G disposed in the adjacent inductive couplers 1102G in the primary and secondary shoulders 1103G, 1004G of the adjacent component 1101G each comprise three windings 601G. Other numbers and combinations of windings 601G may be consistent with the present invention.

Figure 12:
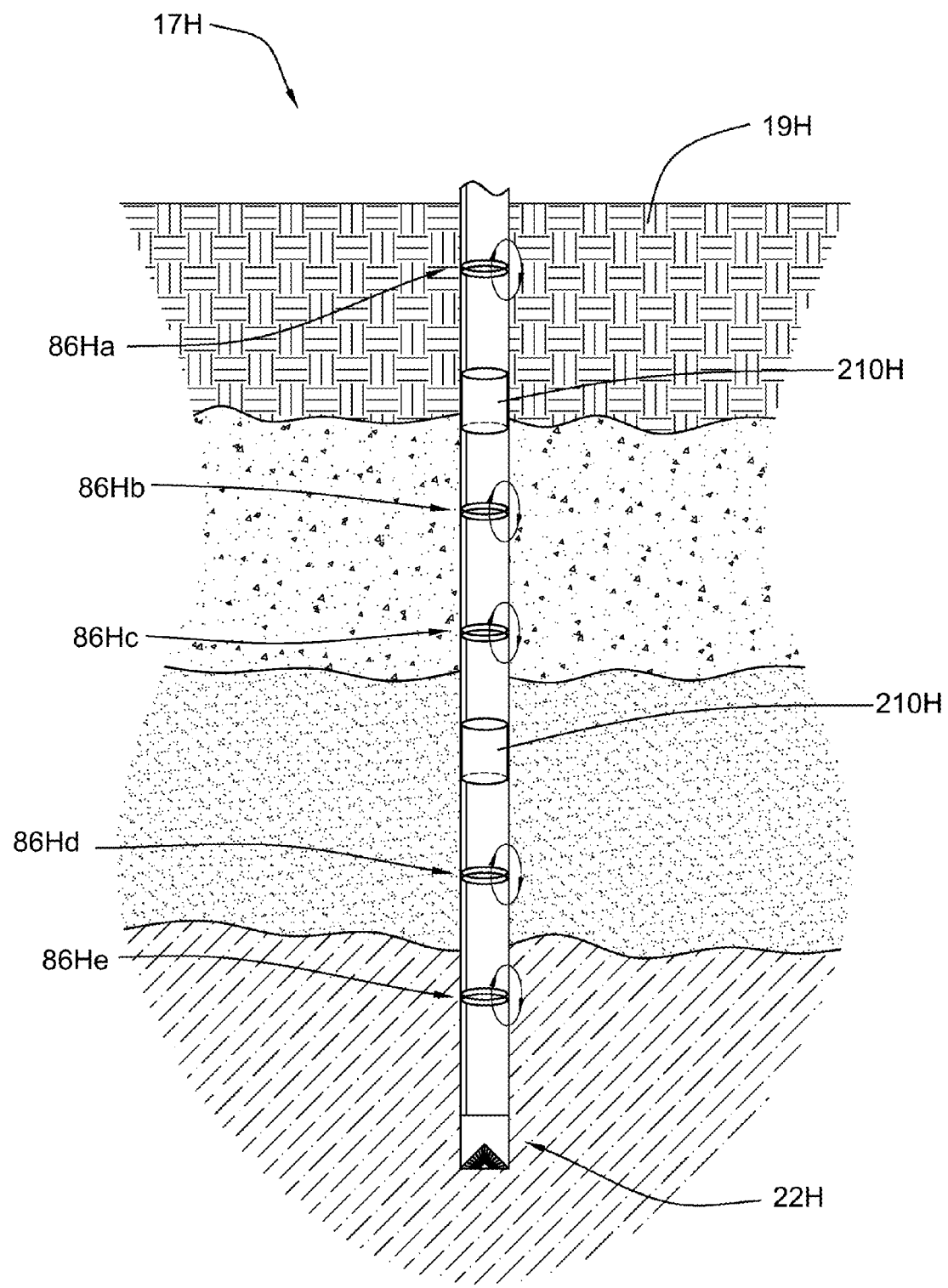
FIG. 12 is a cross-sectional diagram of a formation showing a tool string having a downhole network.

Referring now to FIG. 12, an embodiment of a downhole network 17H in accordance with embodiment of the invention is disclosed comprising various electronic devices 210H spaced at selected intervals along the network 17H. Each of the electronic devices 210H may be in operable communication with a bottom-hole assembly 22H based on power and/or data transfer to the electronic devices 210H. As power or data signals travel up and down the network 17H, transmission elements 86Ha-86He may be used to transmit signals across tool joints of a tool string 12H. Transmission elements 86Ha-86He may comprise an inductive coupler 302H coupled with an adjacent inductive coupler 1102H. Thus, a direct electrical contact is not needed across a tool joint to provide effective power coupling. In selected embodiments, when using transmission elements 86Ha-86He, consistent spacing should be provided between each transmission element 86Ha-86He to provide consistent impedance or matching across each tool joint. This may help to prevent excessive power loss caused by signal reflections or signal dispersion at the tool joint.

Figure 13:
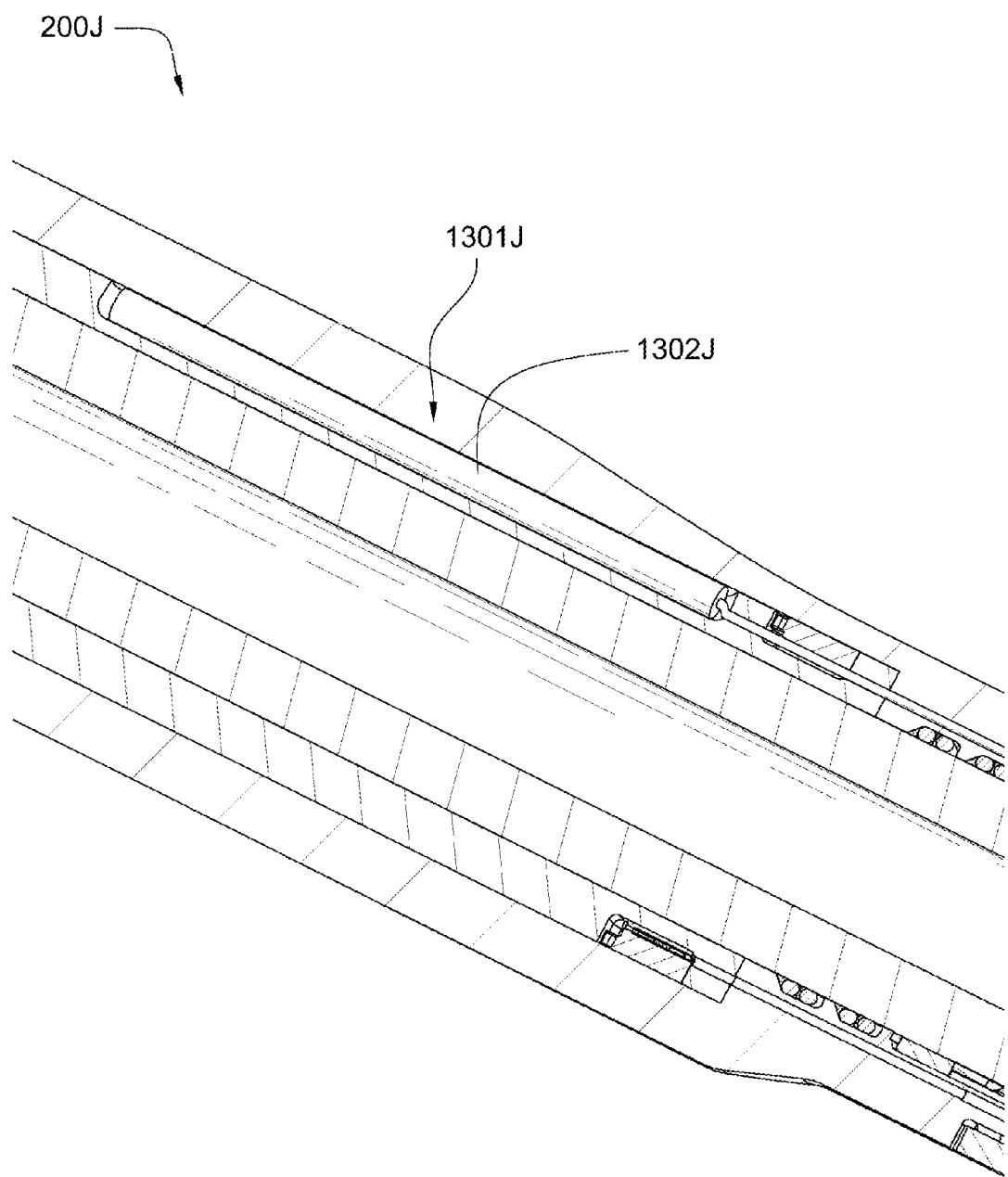
FIG. 13 is a cross-sectional diagram of an embodiment of a tool string component having an embodiment of an electronic device.

FIG. 13 discloses an embodiment in which the electronic device 210J is a power source 1301J. In FIG. 13 the power source 1301J is a battery 1302J. The battery 1302J may store chemical potential energy within it. Because downhole sensors, tools, telemetry and other electronic components require power to operate, a need exists for a reliable energy source to power downhole components. In some embodiments, the power source 1301J may comprise a battery, generator, capacitor, motor, or combinations thereof. A downhole electric power generator may be used to provide power to downhole components. In certain embodiments, the generator may be a micro-generator mounted in the wall of a downhole tool to avoid obstructing the tool's central bore.

In general, a downhole generator in accordance with the invention may include a turbine mechanically coupled to an electrical generator. The turbine may receive a moving downhole fluid, such as drilling mud. This downhole fluid may turn blades of the turbine to produce rotational energy (e.g., by rotating a shaft, etc.). This rotational energy may be used to drive a generator to produce electricity. The electrical power produced by the generator may be used to power electrical equipment such as sensors, tools, telemetry components, and other electronic components. One example of a downhole generator which may be used with the present invention is described in U.S. Pat. No. 7,190,084 which is herein incorporated by reference in its entirety. Preferably, however, the turbine is disposed within the bore of the drill string.

Downhole generators may be AC generators that are configured to produce an alternating current with a frequency between about 100 Hz and 2 kHz. More typically, AC generators are configured to produce an alternating current with a frequency between about 300 Hz and 1 kHz. The frequency of the alternating current is proportional to the rotational velocity of the turbine and generator. In some embodiments of the invention, a frequency converter may alter the frequency from a range between 300 Hz and 1 kHz to a range between 10 kHz and 100 kHz. In certain embodiments, an alternating current with a frequency between about 10 kHz and 100 kHz may achieve more efficient power transmission across the tool joints. Thus, in selected embodiments, the frequency of the alternating current produced by the generator may be shifted to a higher frequency to achieve more efficient power transmission.

To achieve this, a rectifier may be used to convert the alternating current of the generator to direct current. An inverter may convert the direct current to an alternating current having a frequency between about 10 kHz and 100 kHz. The inverter may need to be a custom design since there may be few if any commercially available inverters designed to produce an AC signal between about 400 Hz and 1 MHz. The alternating current at the higher frequency may then be transmitted through electrical conductors 306 routed along the tool string 12. The power signal may be transmitted across tool joints to other downhole tools by way of the transmission elements 86 discussed in the description of FIG. 12.

In selected embodiments, a gear assembly may be provided between the turbine and the generator to increase the rotational speed of the generator relative to the turbine. For example, the gear assembly may be designed such that the generator rotates between about 1.5 and 10 times faster than the turbine. Such an increase in velocity may be used to increase the power generated by the generator as well as increase the frequency of the alternating current produced by the generator. One example of an axially mounted downhole generator that may be used with the present invention is described in patent application Ser. No. 11/611,310 and entitled, "System for steering a tool string," which has common inventors with the present invention and which this specification incorporates by reference for all that it contains.

Referring now to FIG. 14, a flowchart illustrates a method 1400 of transferring power from a downhole tool string component 200 to an adjacent tool string component 1101. The method 1400 comprises a step 1401 of providing a downhole tool string component 200 and an adjacent tool string component 1101 respectively comprising an annular inductive coupler 302 and an adjacent annular inductive coupler 1102. Each coupler 302, 1102 is disposed in an annular recess 301 in a shoulder 204 of an end 202, 203 of one of the components 200, 1101. The method 1400 further comprises a step 1402 of adapting the shoulder 204 of each of the downhole tool string component 200 and the adjacent tool string component 1101 to abut one another when the ends 202, 203 of the components 200, 1101 are mechanically connected to one another. The method 140 further comprises a step 1403 of mechanically connecting the ends 202, 203 of the components 200, 1101 to one another, and a step 1404 of driving an alternating electrical current through the inductive coupler 302 at a frequency of between 10 and 100 kHz. In some embodiments, the alternating electrical current is a square wave.

In some embodiments the alternating electrical current may be driven at a frequency between 50 and 70 kHz. The inductive couplers 302, 1102 may each be disposed within an annular trough 404 of magnetic material. The troughs 404 may each be disposed within an annular recess 301 of the tool string components 200, 1101. At least one of the inductive couplers 302, 1102 may comprise a coil 303 that comprises a plurality of windings 601 of wire strands 602. The wire strands 602 may each be electrically isolated from each other. In some embodiments at least 85% of the energy comprised by the alternating electrical current being driven through the annular inductive coupler 302 may be inductively transferred to the adjacent inductive coupler 1102 when 160 watts are passed through the coil 303 of the inductive coupler 302. In some embodiments at least 95% of the energy may be inductively transferred when 160 watts are passed through the coil 303.

Whereas the present invention has been described in particular relation to the drawings attached hereto, it should be understood that other and further modifications apart from those shown or suggested herein, may be made within the scope and spirit of the present invention.

What is claimed is:

1. A downhole tool string component, comprising:
a tubular body having a first end adapted for a threaded connection to an adjacent tool string component, a first flange disposed around the tubular body and extending away from the tubular body, and a second flange disposed around the tubular body and extending away from the tubular body, the first end having a first shoulder with a annular recess formed therein, the first shoulder adapted to abut an adjacent shoulder of the adjacent the adjacent tool string component with the downhole tool string component threadably connected to the adjacent tool string component;

a sleeve disposed around the first flange, extending to the second flange, and disposed around the second flange, the tubular body, the sleeve, the first flange, and the second flange forming a pocket;

a magnetic coupler disposed in the annular recess, the magnetic coupler comprising an annular trough of magnetic material and a conducting coil disposed therein, the conducting coil having a first lead extending from the annular recess and a second lead extending from the annular recess;

an electrical circuit comprising an electronic device secured within the pocket, a first electrical conductor electrically isolated from the tubular body connecting the electronic device and the first lead, and a second electrical conductor electrically isolated from the tubular body connecting the electronic device and the second lead; and an adjacent tubular body having an adjacent shoulder having an adjacent annular trough, an adjacent magnetic coupler disposed in the adjacent annular recess, the adjacent magnetic coupler comprising an adjacent annular trough of magnetic material and an adjacent conducting coil disposed therein, the adjacent conducting coil having a third lead extending from the annular recess and a fourth lead extending from the annular recess;

wherein the conducting coil has a first number of coil turns and the adjacent conducting coil has a second number of conducting coil turns, wherein the first number and the second number are not equal.

2. The downhole tool string component of claim 1, wherein the magnetic coupler comprises a characteristic of transferring at least 85% energy from the magnetic coupler to the adjacent magnetic coupler when 160 watts are passed through the conducting coil.

3. The downhole tool string component of claim 1, wherein the electronic device is a power source.

4. The downhole tool string component of claim 3, wherein the power source is a battery, generator, capacitor, or a combination of the same.

5. The downhole tool string component of claim 1, wherein the electronic device is a sensor, drill instrument, logging-while-drilling tool, measuring-while-drilling tool, computational board, or a combination of the same.

6. The downhole tool string component of claim 1, wherein the electronic device is a sonic tool.

7. The downhole tool string component of claim 1, wherein the electronic device is in electrical communication with a downhole network.

8. The downhole tool string component of claim 1, wherein the magnetic material comprises a material selected from the group consisting of ferrite, a nickel alloy, a zinc alloy, a manganese alloy, soft iron, a silicon iron alloy, a cobalt iron alloy, a mu-metal, a laminated mu-metal, barium, strontium, carbonate, samarium, cobalt, neodymium, boron, a metal oxide, rare earth metals, and combinations of the same.

9. The downhole tool string component of claim 1, wherein the magnetic material comprises a relative magnetic permeability of between 100 and 20000.

10. The downhole tool string component of claim 1, wherein the first end further comprises a secondary shoulder.

11. The downhole tool string component of claim 10, wherein the magnetic coupler is disposed in the first shoulder and a second magnetic coupler is disposed in the secondary shoulder.

12. The downhole tool string component of claim 10, wherein the magnetic coupler is disposed in the secondary shoulder.

13. The downhole tool string component of claim 1, wherein the two electrical conductors are disposed proximate one another.

14. The downhole tool string component of claim 1, wherein the two electrical conductors are disposed on opposite sides of the magnetic coupler.

15. The downhole tool string component of claim 1, wherein the component comprises a plurality of magnetic couplers.

16. The downhole tool string component of claim 15, wherein at least one of the plurality of magnetic couplers is disposed on the first shoulder of the component and at least one of the plurality of magnetic couplers is disposed on a secondary shoulder of the component.

17. The downhole tool string component of claim 15, wherein at least one of the plurality of magnetic couplers is optimized for the transfer of power and another one of the plurality of magnetic couplers is optimized for the transfer of data.

18. A downhole tool string component, comprising:

a tubular body having a first end adapted for a threaded connection to an adjacent tool string component, a first flange disposed around the tubular body and extending away from the tubular body, and a second flange disposed around the tubular body and extending away from the tubular body, the first end having a first shoulder with a annular recess formed therein, the first shoulder adapted to abut an adjacent shoulder of the adjacent the adjacent tool string component with the downhole tool string component threadably connected to the adjacent tool string component;

a sleeve disposed around the first flange, extending to the second flange, and disposed around the second flange, the tubular body, the sleeve, the first flange, and the second flange forming a pocket;

a magnetic coupler disposed in the annular recess, the magnetic coupler comprising an annular trough of magnetic material and a conducting coil disposed therein, the conducting coil being electrically isolated from the tubular body and having a first lead extending from the annular recess and a second lead extending from the annular recess; and an electronic device secured within the pocket;

a first electrical conductor connecting the electronic device and the first lead;

a second electrical conductor connecting the electronic device and the second lead; and an adjacent tubular body having an adjacent shoulder having an adjacent annular trough, an adjacent magnetic coupler disposed in the adjacent annular recess, the adjacent magnetic coupler comprising an adjacent annular trough of magnetic material and an adjacent conducting coil disposed therein, the adjacent conducting coil having a third lead extending from the annular recess and a fourth lead extending from the annular recess;

wherein the conducting coil has a first number of coil turns and the adjacent conducting coil has a second number of conducting coil turns, wherein the first number and the second number are not equal.

* * * * *